March 12, 1946. H. SINGER 2,396,444
DEVICE FOR PEELING CITRUS FRUIT
Filed Sept. 14, 1944 2 Sheets-Sheet 2
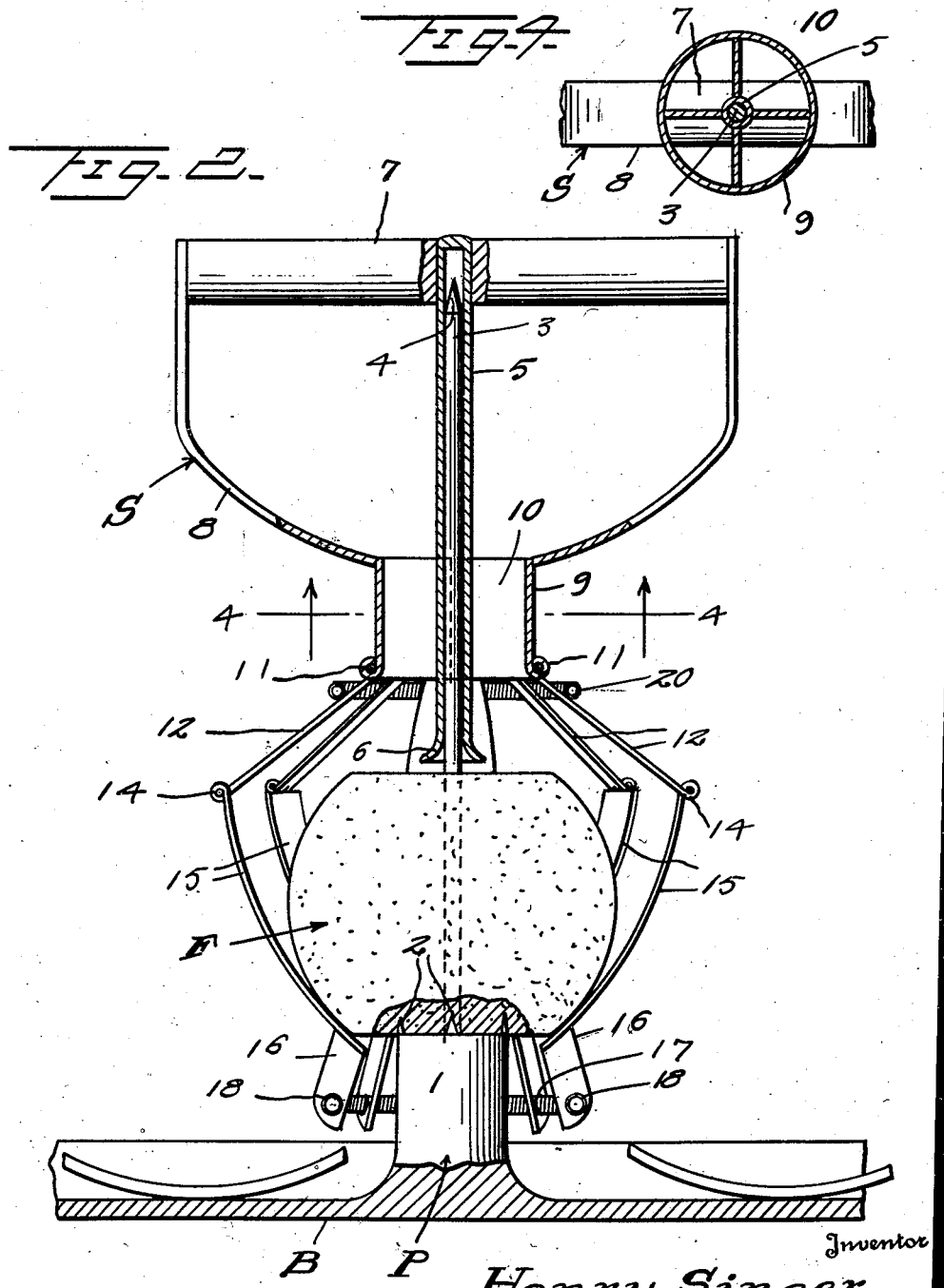
Inventor
Henry Singer
By Wilfred E. Lawson
Attorney Patented Mar. 12, 1946

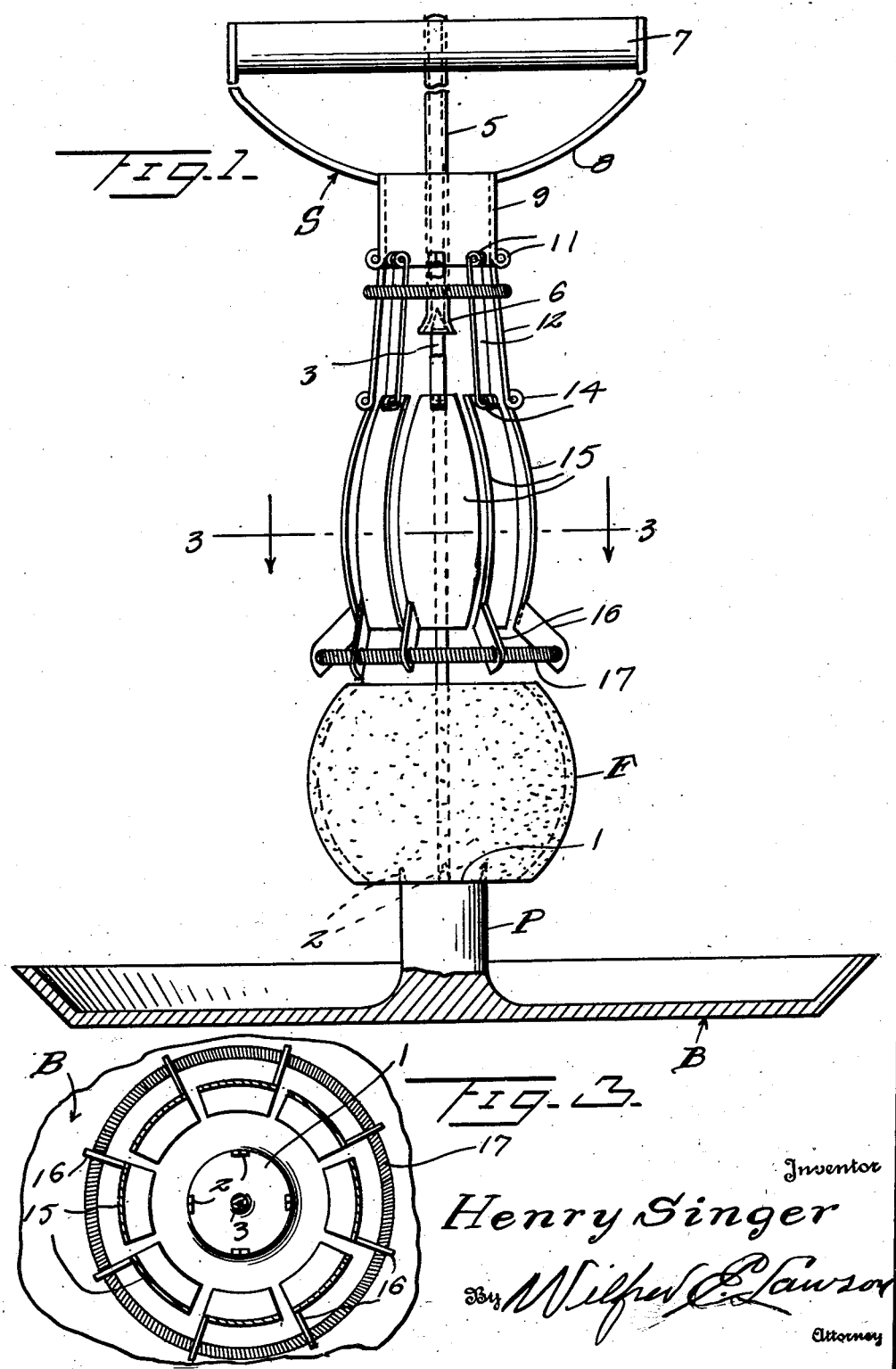

2,396,444

UNITED STATES PATENT OFFICE 2,396,444

DEVICE FOR PEELING CITRUS FRUIT

Henry Singer, Honolulu, Territory of Hawaii

Application September 14, 1944, Serial No. 554,029

5 Claims. (Cl. 146—3)

This invention relates to a device for peeling citrus fruit and more particularly oranges, and it is primarily an object of the invention to provide a device which, by a single operation, will remove all of the skin of the orange or kindred fruit with which it is employed.

Another object of the invention is to provide a device of this kind comprising means for severing the skin of an orange or the like from within at desired points spaced entirely around the fruit, together with further means for pushing or throwing off the skin after being severed.

The invention consists in the details of construction and in the combination and arrangement of the several parts of my improved device for peeling citrus fruit whereby certain important advantages are attained, as will be hereinafter more fully set forth.

In order that my invention may be the better understood, I will now proceed to describe the same with reference to the accompanying drawings, wherein:

Figure 1 is a view in elevation of a device for peeling citrus fruit constructed in accordance with an embodiment of the invention, the base member being in section;

Figure 2 is a view partly in section and partly in elevation of the device as herein disclosed with certain of the parts in a second position from that shown in Figure 1;

Figure 3 is a detail sectional view taken substantially on the line 3—3 of Figure 1; and Figure 4 is a fragmentary detail sectional view taken substantially on the line 4—4 of Figure 2.

In the embodiment of the invention as illustrated in the accompanying drawings, B denotes a tray-like base member of desired dimensions and which is provided at its axial center with an upstanding and relatively short post P, the top face 1 of which is flat and perpendicular to the axial center of the post P. The marginal portion of this flat face 1 at points spaced circumferentially therearound is provided with the upstanding penetrating members or prongs 2.

Extending upwardly from the post P at the axial center thereof is an elongated impaling rod 3 rectangular in cross section and which has its upper extremity pointed, as at 4, to facilitate its passage through the fruit F with which the device is employed. This rod 3 is of considerable length so that after the fruit F has been penetrated by the rod and the fruit F moved down upon the face 1 of the post P, this rod 3 will extend a considerable distance above the fruit F.

The peeling or stripping unit S, as herein disclosed, comprises a tubular rigid member 5 of desired length and which has one end portion, preferably identified as its lower end portion, of a bell-shape, as 6, so that the tubular member 5 may be caused to readily receive the free end portion of the rod 3 or, in other words, to facilitate the rod 3 telescoping within the member 5.

The outer end portion of the member 5 is suitably secured to a cross handle member 7 which is preferably tubular and the extremities of this handle member 7 have rigidly secured thereto the outer end portions of the downwardly and inwardly curved rigid blades or arms 8. The inner extremities of these blades or arms 8 are rigidly secured to the upper portion of a barrel 9 open at both ends and of relatively short length. This barrel 9 is maintained properly centered around the member 5 by the brace arms 10 interposed between and secured to the member 5 and the barrel 9, said brace arms 10 preferably radiating from the tubular member 5.

The barrel 9, as illustrated in the accompanying drawings, is cylindrical in form, and hingedly connected, as at 11, to the lower marginal portion of the barrel 9 are the extremities of the rigid flat strap bars 12 of a predetermined length. These bars 12 are equidistantly spaced around the barrel 9 and the outer extremities of these bars 12 are hingedly connected, as at 14, to the inner end portions of the pusher blades 15. These pusher blades 15 are curved from end to end and also curved transversely and said curvatures are such as to facilitate the proper coaction of the blades 15 with the fruit F during a peeling operation.

The blades 15 at corresponding lower corner portions are provided with the outstanding and substantially flat cutting blades or knives 16, the flat faces of which are disposed in a direction lengthwise of the blades 15. These blades or knives 16 are of a length sufficient to assure the desired slicing of the skin or rind of the fruit F as the blades 15 are forced beneath the skin or rind of the fruit. During this action, the blades or knives 16 will slice the skin or rind of the fruit F and the curvature of the blades 15 which follows the knives will cause the sliced skin or rind to be separated from the pulp of the fruit and which action is further facilitated by the tendency of the arms 12 to force the adjacent or upper extremities of the blades 15 outwardly or in a direction away from the fruit.

The outer or lower extremities of the blades 15 are normally urged inwardly or toward retracted position by a retractile member 17, herein disclosed as a coiled spring, which threads through the outer end portions of the blades or knives 16 which are provided with the openings 18 for such purpose. The member 17 is continuous and is of a character to readily allow the desired outward movement of the adjacent end portions of the blades 15 as may be required to properly pass under the skin or rind of the fruit yet maintaining said end portions of the blades 15 as well as the knives or blades 16 in effective working positions.

The upper portions of the bars 12 are also surrounded by a retractile member 19, herein disclosed as a coiled spring. This member 19 is continuous and is suitably secured, as at 20, to each of said bars 12.

It is to be pointed out that the base member or tray B is of such size as to readily receive the segments of the peeled skin or rind as may be thrown off of the fruit F.

In practice, it is to be explained that before the fruit F is applied upon the rod 3, the top and bottom portions of the fruit F are sliced and leveled off so that the fruit will stand upright without rolling. It is also believed to be apparent that after the fruit F has been impaled upon the rod 3, the penetration of the members or prongs 2 will assure the fruit F being effectively maintained in position for desired coaction therewith of the blades 15 and the knives or blades 16 as the barrel 9 is forced downwardly or toward the fruit F. It is believed to be readily apparent that the blades 15, as they are forced downwardly, will crowd each separate segment of skin or rind as cut by the knives or blades 16 away from the center pulp body of the fruit until the severed segment is completely separated from the pulp body. Immediately after the cutting and severing operation and upon the initial lifting movement of the blades 15 and the knives or blades 16, the pressure exerted by the springs 17 and 19 will be relieved and the curvature of the blades 15 will allow such blades to easily follow upward along the periphery or contour wall of the pulp body until they reach their normal relaxed position above the fruit body or what may be termed the starting point.

The springs 17 and 19 play an important part in the operation of the device as the expansion thereof provides for wider slices or segments of skin or rind or larger sized fruit or, in other words, permit a single device to be used with fruit of varying sizes within, of course, reasonable limitations.

It is believed to be obvious that in the application or removal of the fruit F with respect to the rod 3, the unit S is entirely separated therefrom.

From the foregoing description it is thought to be obvious that a device for peeling citrus fruit constructed in accordance with my invention is particularly well adapted for use by reason of the convenience and facility with which it may be assembled and operated.

I claim:

1. A device for peeling globular fruit such as oranges and the like, comprising means for securing the fruit against movement, said means forming a guide, an annular radially expansible member adapted to encircle the guide, a second annular member encircling the guide and adapted to be moved longitudinally thereof, a series of relatively long wide blades arranged in a circle around said guide and oscillatably supported on the first member for swinging movement radially with respect to the guide, a series of arms pivotally coupling the blades at their other ends with the second annular member, said annular members being relatively movable longitudinally of the guide, cutting members joined to said blades adjacent to the first member, and spring means connecting said arms and constantly urging concerted movement of the said other ends of the blades together, said blades being oscillated outwardly on the said expansible member by the arms upon movement of the annular members toward one another.

2. A device for removing skin from globular fruit such as oranges and the like, comprising a pin member forming a guide on which the fruit is mounted, a substantially circular expansible member encircling the guide and having a diameter less than the diameter of the fruit to be peeled, a series of cutter members oscillatably supported upon said circular member, a series of relatively long arcuate blades each supported upon a cutter member for oscillation on the circular member, an annular member encircling the guide and disposed at the opposite ends of the blades from the circular member, the annular and circular members being movable longitudinally of the guide and also being adapted to have relative movement one toward and away from the other, a plurality of relatively stiff arms connecting the annular member with the said other ends of the blades whereby movement of the annular member toward the circular member will effect forcible movement of the fruit through the circular member, the expansion of the circular member and the oscillation of the blades and knives upon the circular member to cut and peel the skin of the fruit, and resilient means constantly urging the arms to swing together at the ends joining the blades whereby to normally maintain the blades and arms in relatively close encircling relation with the guide.

3. A device for peeling globular fruit such as oranges and the like, comprising a coil spring annulus, a relatively long pin upon which the fruit is impaled, the annulus encircling the pin and being designed to be forced over the fruit from one side of the latter to the other, a plurality of knives oscillatably supported upon the annulus to slit the skin of the fruit as the annulus is being forced over the fruit, means connected with the knives for stripping the skin from the fruit as the skin is being slit, and means connected with the last mentioned means for forcing the annulus over the fruit and for oscillating the knives and the skin stripping means relatively to the fruit to effect the separation of the skin from the body of the fruit.

4. A device for peeling globular fruit as stated in claim 3, in which the last mentioned means comprises a tubular sleeve, a second annulus operatively coupled with the sleeve and encircling the guide pin, rigid arms pivotally coupled at one end with the second annulus and pivotally coupled at their other ends with the skin stripping means, and a spring annulus encircling the arms and constantly urging the same to oscillate inwardly on the second annulus toward the pin.

5. A device as stated in claim 3, including a tray having a central post, said pin being secured in the center of said post, and means upon the post around the pin for securing a body of fruit against turning around the pin.

HENRY SINGER.